United States Patent
Adachi

(10) Patent No.: US 10,596,896 B2
(45) Date of Patent: Mar. 24, 2020

(54) CONNECTING STRUCTURE CONNECTING IN-WHEEL MOTOR UNIT AND STRUT-TYPE SUSPENSION APPARATUS

(71) Applicant: TOYOTA JIDOSHA KABUSHIKI KAISHA, Toyota-shi, Aichi-ken (JP)

(72) Inventor: Satoshi Adachi, Nagoya (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/117,169

(22) Filed: Aug. 30, 2018

(65) Prior Publication Data
US 2019/0070950 A1    Mar. 7, 2019

(30) Foreign Application Priority Data
Sep. 4, 2017 (JP) .................. 2017-169788

(51) Int. Cl.
| | |
|---|---|
| *B60K 1/00* | (2006.01) |
| *B60K 17/30* | (2006.01) |
| *B60K 7/00* | (2006.01) |
| *B60G 3/06* | (2006.01) |
| *B60K 17/04* | (2006.01) |
| *B60G 3/01* | (2006.01) |

(52) U.S. Cl.
CPC .............. *B60K 7/0007* (2013.01); *B60G 3/01* (2013.01); *B60G 3/06* (2013.01); *B60K 17/043* (2013.01); *B60G 2200/142* (2013.01); *B60G 2200/46* (2013.01); *B60G 2200/464* (2013.01); *B60G 2204/182* (2013.01); *B60G 2300/50* (2013.01); *B60K 2007/0038* (2013.01); *B60K 2007/0061* (2013.01); *B60K 2007/0092* (2013.01)

(58) Field of Classification Search
CPC .... B60K 2007/0038; B60K 2007/0061; B60K 2007/0092; B60K 7/0007; B60K 17/043; B60K 17/30; B60K 1/00; B60K 17/046
See application file for complete search history.

(56) References Cited

U.S. PATENT DOCUMENTS

| | | | | |
|---|---|---|---|---|
| 4,913,258 A | * | 4/1990 | Sakurai ................ | B60K 7/0007 180/242 |
| 6,113,119 A | * | 9/2000 | Laurent .................... | B60G 3/01 280/124.1 |
| 7,607,671 B2 | * | 10/2009 | McConville ............. | B60G 3/20 280/124.134 |

(Continued)

FOREIGN PATENT DOCUMENTS

| | | |
|---|---|---|
| JP | 2013-163401 A | 8/2013 |
| JP | 2017-065321 A | 4/2017 |

*Primary Examiner* — Bryan A Evans
(74) *Attorney, Agent, or Firm* — Sughrue Mion, PLLC

(57) ABSTRACT

A connecting structure connecting: (A) an in-wheel motor unit housed in a wheel and including a wheel holding member holding the wheel, a motor for driving the wheel, and a speed reducer configured to transmit, to the wheel, rotation of the motor while reducing a speed of the rotation; and (B) a strut-type suspension apparatus including a shock absorber connected at an upper end portion thereof to a body of a vehicle and at a lower end portion thereof to the in-wheel motor unit, the strut-type suspension apparatus being configured to suspend the wheel and the in-wheel motor unit, wherein the shock absorber is disposed so as to intersect a rotation axis of the wheel.

6 Claims, 4 Drawing Sheets

VEHICLE FRONT SIDE

(56) References Cited

U.S. PATENT DOCUMENTS

| | | | |
|---|---|---|---|
| 7,963,538 B2* | 6/2011 | Roland | B60G 3/26 280/124.138 |
| 8,083,243 B2* | 12/2011 | Hamada | B60G 7/02 180/65.51 |
| 9,331,546 B2* | 5/2016 | Kim | H02K 7/14 |
| 2007/0068715 A1* | 3/2007 | Mizutani | B60G 3/20 180/65.51 |
| 2012/0217789 A1* | 8/2012 | Yamamoto | B60G 3/20 301/6.5 |
| 2013/0057048 A1* | 3/2013 | Ishikawa | B60K 7/0007 301/6.5 |
| 2016/0221432 A1* | 8/2016 | Tamura | B60G 3/20 |

* cited by examiner

VEHICLE FRONT SIDE

VEHICLE FRONT SIDE

CONNECTING STRUCTURE CONNECTING IN-WHEEL MOTOR UNIT AND STRUT-TYPE SUSPENSION APPARATUS

CROSS REFERENCE TO RELATED APPLICATION

The present application claims priority from Japanese Patent Application No. 2017-169788, which was filed on Sep. 4, 2017, the disclosure of which is herein incorporated by reference in its entirety.

BACKGROUND

Technical Field

The following disclosure relates to a structure of a vehicle equipped with an in-wheel motor and more particularly to a connecting structure connecting the in-wheel motor unit and a strut-type suspension apparatus (MacPherson-type suspension apparatus).

Description of Related Art

Japanese Patent Application Publication No. 2017-65321 describes an electric-motor driven vehicle (electric vehicle) equipped with an in-wheel motor. An in-wheel motor unit including the in-wheel motor is housed in a wheel, and a suspension apparatus is provided between the in-wheel motor unit and a body of the vehicle. The vehicle described in the above Publication employs, as the suspension apparatus, a strut-type suspension apparatus (MacPherson-type suspension apparatus).

SUMMARY

The strut-type suspension apparatus is simple in structure and is constituted by the reduced number of components, resulting in a cost reduction. It is thus desirable to employ the strut-type suspension apparatus in the electric vehicle described above. In the case where the strut-type suspension apparatus is employed in the electric vehicle equipped with the in-wheel motor, however, there remains much room for improvement in the connecting structure connecting the in-wheel motor unit and the suspension apparatus. That is, various modifications to the connecting structure improve the utility of the electric vehicle. Accordingly, the present disclosure relates to a connecting structure connecting the in-wheel motor unit and the strut-type suspension apparatus for achieving an electric vehicle having high utility.

One aspect of the present disclosure relates to a connecting structure connecting: (A) an in-wheel motor unit housed in a wheel and including a wheel holding member holding the wheel, a motor for driving the wheel, and a speed reducer configured to transmit, to the wheel, rotation of the motor while reducing a speed of the rotation; and (B) a strut-type suspension apparatus including a shock absorber connected at an upper end portion thereof to a body of a vehicle and at a lower end portion thereof to the in-wheel motor unit, the strut-type suspension apparatus being configured to suspend the wheel and the in-wheel motor unit, wherein the shock absorber is disposed so as to intersect a rotation axis of the wheel.

Advantageous Effects

The electric vehicle equipped with the in-wheel motor does not need a drive shaft (axle shaft). According to the connecting structure connecting the present disclosure, a lower end portion of the shock absorber is disposed in a space of the electric vehicle corresponding to a space in which the drive shaft is disposed in ordinary vehicles not equipped with the in-wheel motor. Further, in the connecting structure connecting the present disclosure, a lower end of the shock absorber is located at a height level lower than a height level of a rotation axis of the wheel. That is, as compared with a case in which the strut-type suspension apparatus is provided in the ordinary vehicles, the connecting structure connecting the present disclosure can lower a height level of an upper end of the shock absorber at which the shock absorber is attached to the body of the vehicle and can increase a length of the shock absorber. Thus, the connecting structure according to the present disclosure enhances a degree of freedom in the design of a chassis of the electric vehicle.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
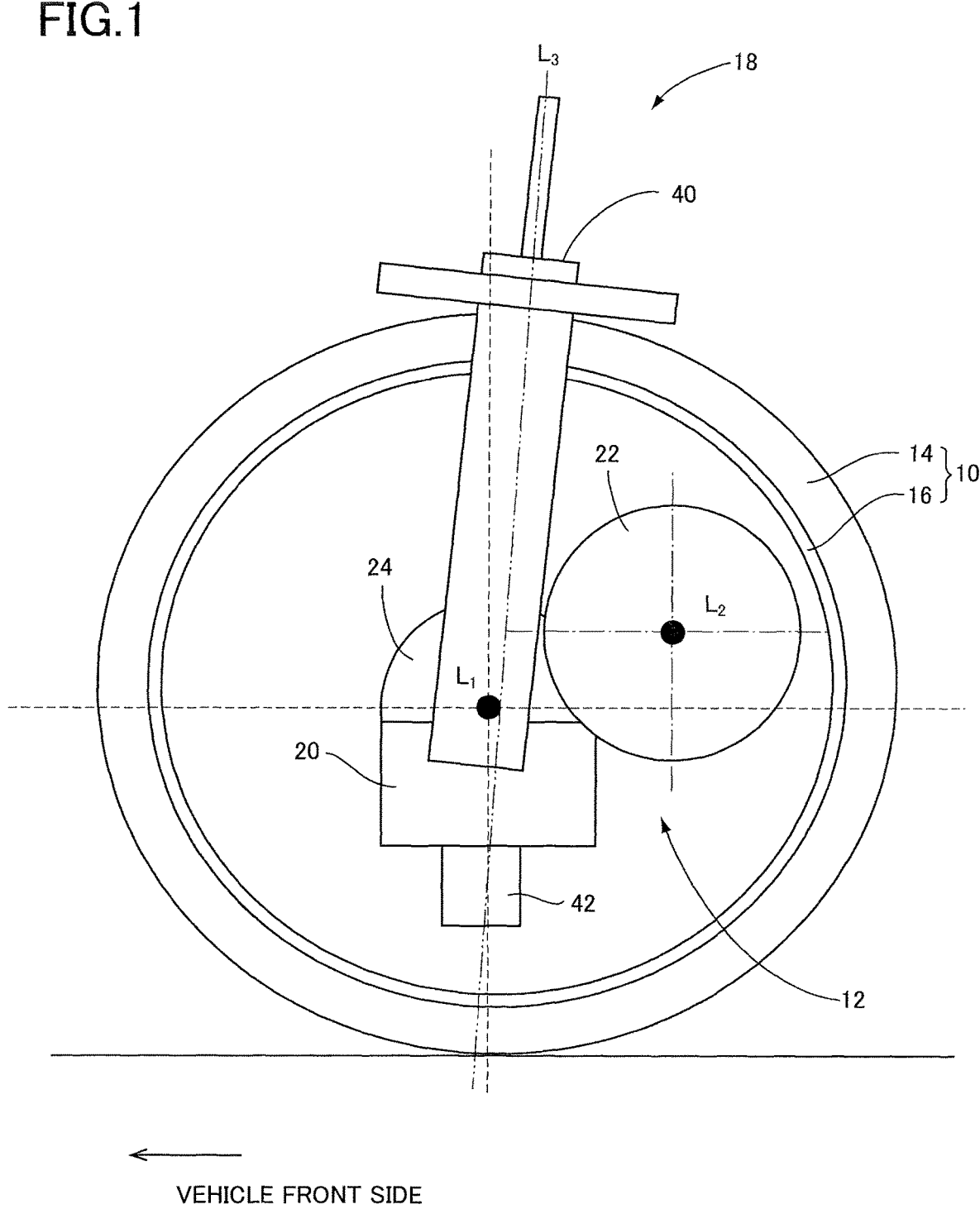
FIG. 1 is a schematic side view of a chassis of an electric vehicle which employs a connecting structure according to a first embodiment.

Referring to the drawings, there will be explained below in detail embodiments of the present disclosure. It is to be understood that the present disclosure is not limited to the details of the following embodiments but may be embodied with various changes and modifications based on the knowledge of those skilled in the art.

1. First Embodiment

Figure 2:
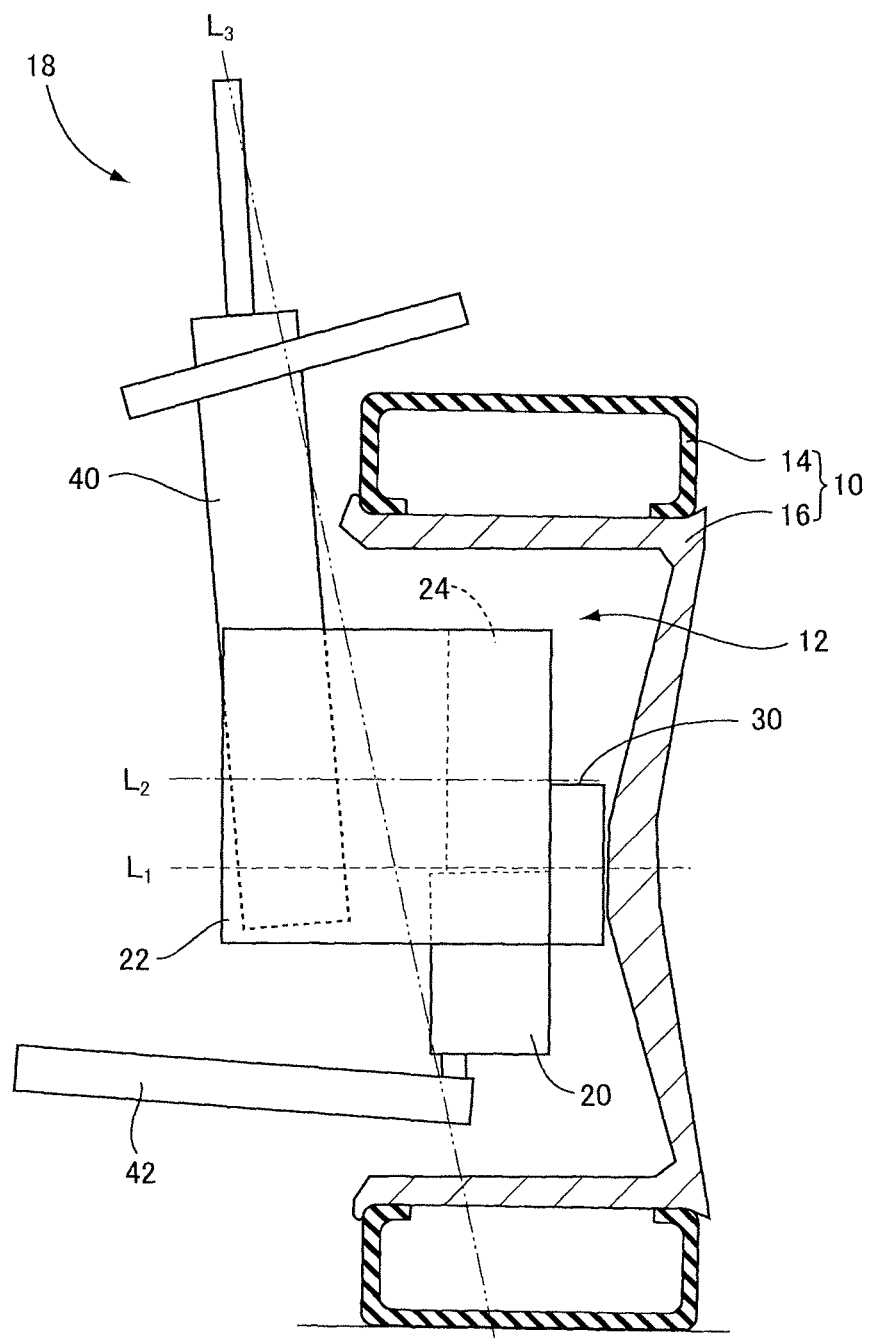
FIG. 2 is a schematic view of the chassis of the electric vehicle which employs the connecting structure according to the first embodiment, the view seen from a rear side of the vehicle.

FIGS. 1 and 2 are schematic views of a chassis of a vehicle which employs a connecting structure connecting an in-wheel motor unit and a strut-type suspension apparatus according to a first embodiment. The vehicle is an electric-motor driven vehicle (electric vehicle) and includes in-wheel motor units 12 provided for respective front right and left wheels 10. The front wheel 10 includes a tire 14 and a wheel body 16 (hereinafter simply referred to as "wheel 16"), and an in-wheel motor unit 12 is housed inside the wheel 16. Each of the front wheels 10 is suspended with respect to a body of the vehicle by a suspension apparatus 18 together with the in-wheel motor unit 12 housed therein.

The in-wheel motor unit 12 includes a wheel holding member 20 holding the wheel 10, a motor 22 for driving the front wheel 10, and a speed reducer 24 configured to transmit, to the front wheel 10, rotation of the motor 22 while reducing a speed of the rotation.

The wheel holding member 20 is a portion functioning as a steering knuckle and rotatably holds the front wheel 10 via a wheel hub 30. The speed reducer 24 is disposed integrally with the wheel holding member 20. While not shown, an output shaft of the speed reducer 24 is connected to the front wheel 10, and a rotation axis of the output shaft of the speed reducer 24 coincides with a rotation axis $L_1$ of the front wheel 10. Further, the motor 22 is also disposed integrally with the wheel holding member 20. It is, however, noted that an output shaft of the motor 22 (rotation axis $L_2$) is shifted with respect to the rotation axis $L_1$ of the front wheel 10, namely, with respect to the rotation axis of the output shaft of the speed reducer 24. The in-wheel motor unit 12 has a stepped shape in which the motor 22 protrudes toward an inner side in the vehicle width direction from the wheel holding member 20 and the speed reducer 24.

The suspension apparatus 18 is disposed between the vehicle body and the in-wheel motor unit 12. The suspension apparatus 18 is a strut-type suspension apparatus (MacPherson-type suspension apparatus) and includes a shock absorber 40, as a strut, extending in the up-down direction and a lower arm 42 extending in the vehicle width direction. The shock absorber 40 is connected at its upper end portion to the vehicle body and at its lower end portion to the in-wheel motor unit 12 as later explained in detail. The lower arm 42 is connected at its inner end portion in the vehicle width direction to the vehicle body and at its outer end portion in the vehicle width direction to a lower portion of the in-wheel motor unit 12. The shock absorber 40 and the lower arm 42 cause the in-wheel motor unit 12 and the front wheel 10 to move upward and downward with respect to the vehicle body following a substantially constant trajectory.

As explained above, the shock absorber 40 is connected at its lower end portion to the in-wheel motor unit 12. Specifically, the lower end portion of the shock absorber 40 is connected to the in-wheel motor unit 12 on the inner side of the in-wheel motor unit 12 in the vehicle width direction. As shown in FIG. 1, the shock absorber 40 is connected to the in-wheel motor unit 12 such that the lower end portion of the shock absorber 40 intersects the rotation axis $L_1$ of the front wheel 10 when viewed in the vehicle width direction. The vehicle in the present embodiment does not include drive shafts which are connected respectively to the front right and left wheels 10. Accordingly, a lower end of the shock absorber 40 is located at a height level lower than a height level of the rotation axis $L_1$ of the front wheel 10. In the present vehicle, therefore, a height level of an upper end of the shock absorber 40 is made lower, as compared with a case in which the strut-type suspension apparatus is employed in a vehicle having the drive shafts. According to the connecting structure connecting the in-wheel motor unit 12 and the strut-type suspension apparatus 18 of the present embodiment, it is possible to increase a length of the shock absorber. In such a case, by increasing a length over which a cylinder and a rod of the absorber engage with each other, a strength of the shock absorber and a stroke length of the shock absorber can be increased, for instance.

As shown in FIG. 2, when viewed from the rear side of the vehicle, the shock absorber 40 is arranged in the front-rear direction of the vehicle with respect to the motor 22 that protrudes toward the inner side in the vehicle width direction, such that the shock absorber 40 is disposed on the front side of the motor 22. Thus, the connecting structure connecting the in-wheel motor unit 12 and the strut-type suspension apparatus 18 of the present embodiment prevents or reduces an increase in a distance between the suspension apparatus 18 and the front wheel 10 in the vehicle width direction.

The front wheel 10 is configured to be steered (turned) about a straight line $L_3$ connecting a connection point of the upper end of the shock absorber 40 to the vehicle body and a connection point of the lower min 42 to the in-wheel motor unit 12. That is, the straight line $L_3$ is a king pin axis and passes a portion of the front wheel 10 contacting the ground, namely, passes a ground contacting surface of the tire 14. As shown in FIG. 1, the shock absorber 40 is disposed so as to overlap the king pin axis $L_3$ when viewed in the vehicle width direction. Accordingly, the connecting structure connecting the in-wheel motor unit 12 and the strut-type suspension apparatus 18 of the present embodiment enables an appropriate movement of the front wheel 10 by being steered. Further, an extension direction of the shock absorber 40 is close to an extension direction of the king pin axis $L_3$, namely, a difference between the two extension directions is small, so that the present connecting structure reduces friction of the shock absorber 40 in its extending and contracting movement when the front wheel 10 moves upward and downward with respect to the vehicle body.

The connecting structure connecting the in-wheel motor unit and the strut-type suspension apparatus of the present disclosure may be employed in a rear wheel together with or in place of the front wheel 10. While, in the present embodiment, the front wheel 10 in which the connecting structure is employed is a steerable wheel, the connecting structure may be employed in a non-steerable wheel.

2. Second Embodiment

Figure 3:
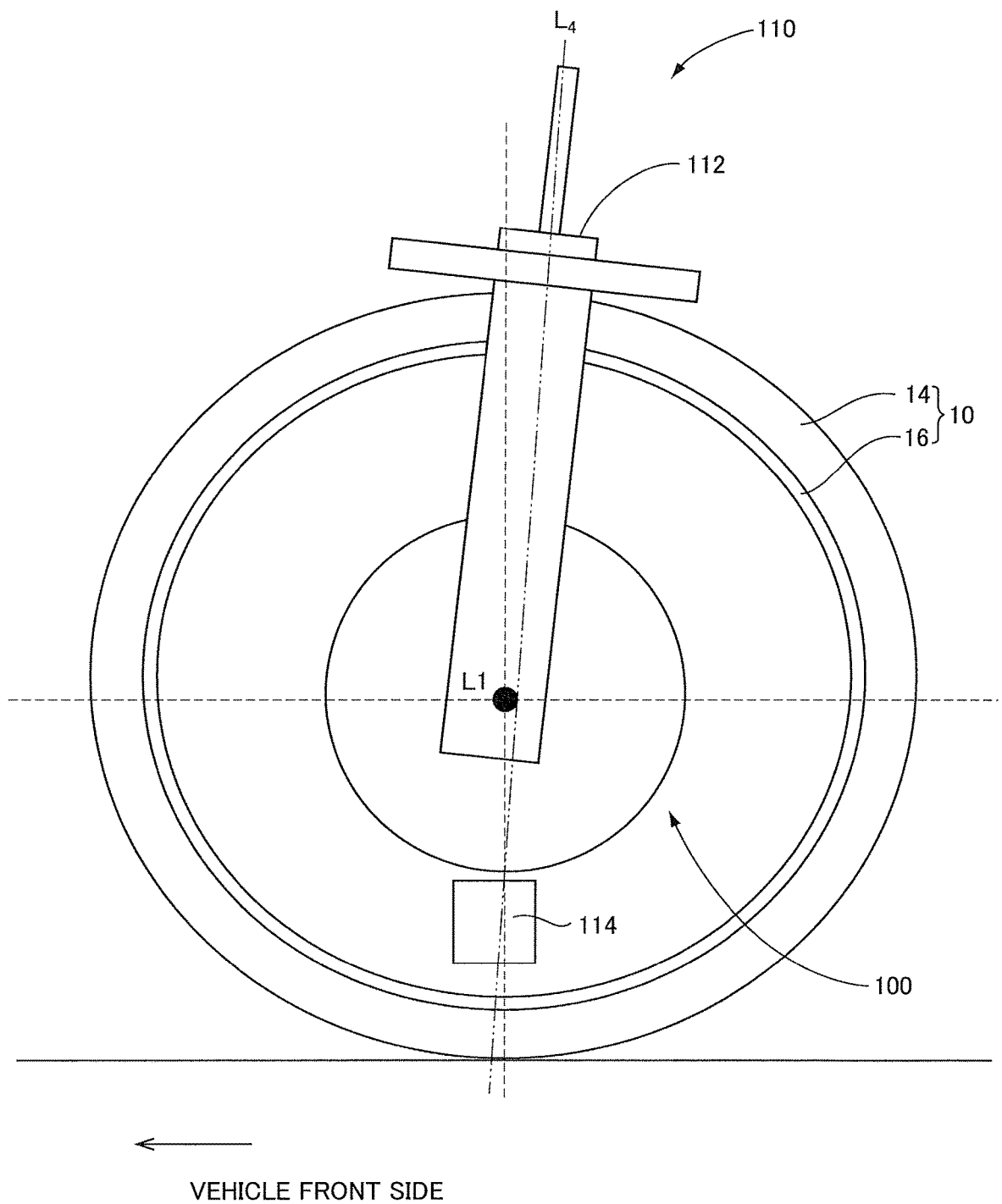
FIG. 3 is a schematic side view of a chassis of an electric vehicle which employs a connecting structure according to a second embodiment.
Figure 4:
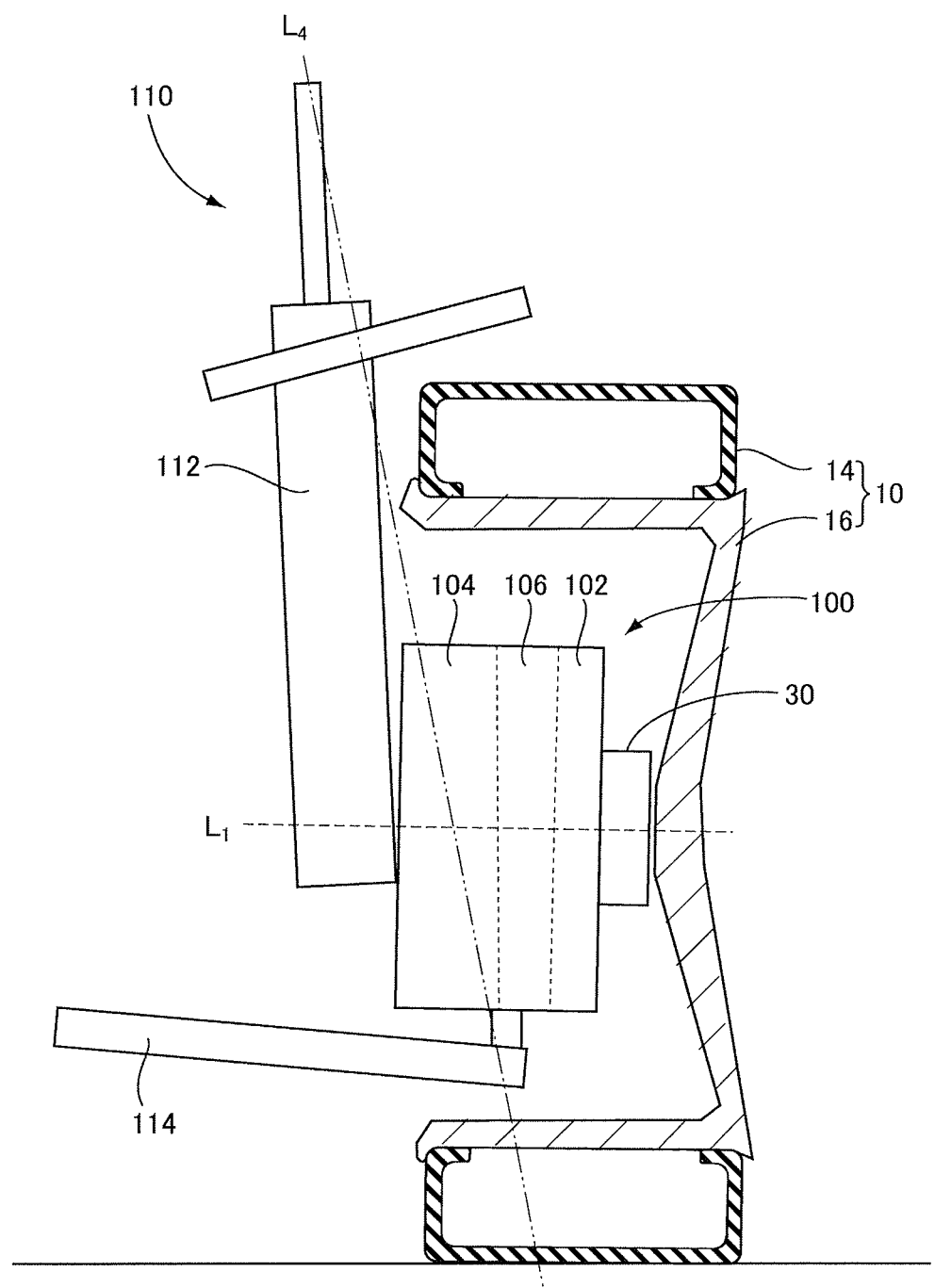
FIG. 4 is a schematic view of the chassis of the electric vehicle which employs the connecting structure according to the second embodiment, the view seen from the rear side of the vehicle.

FIGS. 3 and 4 are schematic views of a chassis of a vehicle that employs a connecting structure connecting an in-wheel motor unit and a strut-type suspension apparatus according to a second embodiment. The connecting structure of the second embodiment differs from the connecting structure of the first embodiment in that the structure of an in-wheel motor unit 100 differs from that of the in-wheel motor unit 12. Like the in-wheel motor unit 12 in the first embodiment, the in-wheel motor unit 100 includes a wheel holding member 102, a motor 104, and a speed reducer 106. It is noted that, in the in-wheel motor unit 100, the rotation axis of the front wheel 10, a rotation axis of an output shaft of the speed reducer 106, and a rotation axis of the motor 104 coincide with one another.

A shock absorber 112 of the strut-type suspension apparatus 110 is connected at its lower end portion to the in-wheel motor unit 100 on the inner side of the in-wheel motor unit 100 in the vehicle width direction. As shown in FIG. 3, when viewed in the vehicle width direction, the shock absorber 112 is also connected to the in-wheel motor unit 100 such that the lower end portion of the shock absorber 112 intersects the rotation axis $L_1$ of the front wheel 10. That is, as in the first embodiment, a lower end of the shock absorber 112 is located at a height level lower than the height level of the rotation axis $L_1$ of the front wheel 10.

As shown in FIG. 3, in the connecting structure of the second embodiment, the shock absorber 112 is disposed so as to overlap, when viewed in the vehicle width direction, a king pin axis $L_4$ connecting a connection point of an upper end of the shock absorber 112 to the vehicle body and a connection point of a lower arm 114 to the in-wheel motor unit 100, as in the connecting structure of the first embodiment.

What is claimed is:

1. A connecting structure connecting: (A) an in-wheel motor unit housed in a wheel and including a wheel holding member holding the wheel and functioning as a steering knuckle, a motor for driving the wheel, and a speed reducer configured to transmit, to the wheel, rotation of the motor while reducing a speed of the rotation; and (B) a strut-type suspension apparatus including a shock absorber connected at an upper end portion thereof to a body of a vehicle and at a lower end portion thereof to the in-wheel motor unit, the strut-type suspension apparatus being configured to suspend the wheel and the in-wheel motor unit,
wherein the shock absorber is disposed so as to intersect a rotation axis of the wheel.

2. The connecting structure according to claim 1,
wherein the speed reducer includes an output shaft to the wheel and is disposed such that a rotation axis of the output shaft and the rotation axis of the wheel coincide with each other,
wherein the motor is fixed to the wheel holding member such that a rotation axis of the motor is shifted with respect to the rotation axis of the output shaft of the speed reducer, and
wherein the shock absorber is disposed so as to be arranged in a front-rear direction of the vehicle with respect to the motor.

3. The connecting structure according to claim 2,
wherein the motor is fixed to the wheel holding member so as to be shifted with respect to the speed reducer toward a rear side of the vehicle, and
wherein the shock absorber is disposed on a front side of the motor.

4. The connecting structure according to claim 1,
wherein the speed reducer includes an output shaft to the wheel and is disposed such that a rotation axis of the output shaft coincides with the rotation axis of the wheel,
wherein the motor is fixed to the wheel holding member such that a rotation axis of the motor coincides with the rotation axis of the output shaft of the speed reducer, and
wherein the shock absorber is connected at the lower end portion thereof to the in-wheel motor unit on an inner side of the in-wheel motor unit in a width direction of the vehicle.

5. The connecting structure according to claim 1,
wherein the strut-type suspension apparatus includes a lower arm connected to the in-wheel motor unit under the shock absorber, the strut-type suspension apparatus being configured such that a king pin axis connecting a connection point of the lower arm to the in-wheel motor unit and a connection point of the shock absorber to a body of the vehicle passes a portion of the wheel that is contacting the ground, and
wherein the shock absorber is disposed so as to overlap the king pin axis when viewed in a width direction of the vehicle.

6. The connecting structure according to claim 5, wherein the king pin axis intersects a plane, which extends in a front-rear direction of the body of the vehicle and passes through the rotation axis of the wheel, at a point behind the rotation axis of the wheel.

* * * * *